United States Patent [19]

Lynch

[11] Patent Number: 4,583,115
[45] Date of Patent: Apr. 15, 1986

[54] CIRCUIT FOR AND METHOD OF BROADBAND COMB FILTERING A COMPOSITE VIDEO SIGNAL WHICH HAS BEEN DOUBLE-SIDE BAND DETECTED

[75] Inventor: Edward I. Lynch, Portsmouth, Va.

[73] Assignee: General Electric Company, Portsmouth, Va.

[21] Appl. No.: 646,335

[22] Filed: Aug. 31, 1984

[51] Int. Cl.$^4$ ............................................. H04N 9/64
[52] U.S. Cl. ........................................ 358/31; 358/36
[58] Field of Search ............... 358/31, 36, 37, 23, 358/21 R; 329/101, 204

[56] References Cited

U.S. PATENT DOCUMENTS

| 3,715,477 | 2/1973 | Olson | 358/36 |
|---|---|---|---|
| 4,003,079 | 1/1977 | Woo | 358/31 |
| 4,074,321 | 2/1978 | Miller | 358/31 |
| 4,096,516 | 6/1978 | Pritchard | 358/31 |
| 4,241,363 | 12/1980 | Maeyama et al. | 358/36 |
| 4,245,237 | 1/1981 | Lagoni | 358/31 |
| 4,291,331 | 9/1981 | Devereux | 358/13 |
| 4,365,266 | 12/1982 | Lagoni | 358/37 |
| 4,419,689 | 12/1983 | Russell et al. | 358/37 |

OTHER PUBLICATIONS

"Color TV Picture Enhancement with a CCD Comb Filter", Pritchard, RCA Engineer, 25-26, Apr./May/Jun., 1980, p. 6.

"A CCD Comb Filter IC for Consumer TV Applications", Carnes and Sauer, RCA Engineer, 25-26, Apr./May/Jun., 1980, pp. 7-10.

"Product Design of a Base-Band Comb Filter System", Lagoni RCA Engineer, 25-26, Apr./May/Jun. 1980, pp. 11-15.

Primary Examiner—James J. Groody
Assistant Examiner—Michael P. Dunnam

[57] ABSTRACT

A circuit and method are described for separating the luminance from the chrominance signals which are frequency interleaved in a vestigial sideband composite video signal of the type generated in the NTSC system developed in the United States. The vestigial frequencies are double-sideband detected. The non-vestigial frequencies are passed through a high pass filter and a comb filter. The luminance signals at the output of the comb filter is recombined with the double sideband detected vestigial luminance signal to provide a flat combed luminance output. The chrominance signal at the output of the comb filter is advantageously bandpass filtered prior to being introduced into the chroma detectors or demodulators, or low pass filtered at the output of such detectors or demodulators.

15 Claims, 4 Drawing Figures

FIG. 2
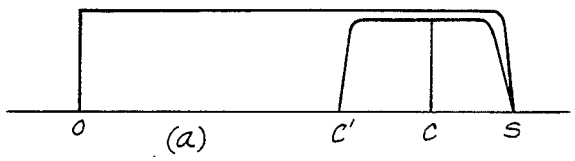
STUDIO VIDEO
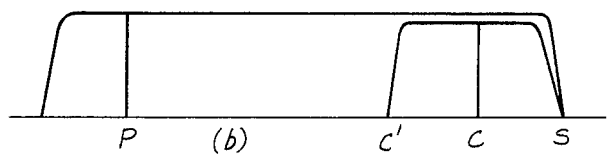
TRANSMITTED SIGNAL-
DOUBLE SIDEBAND TO
750 KHz
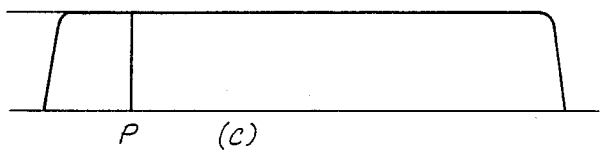
PROPOSED TV IF
RESPONSE
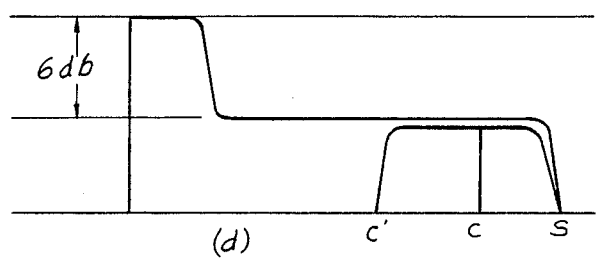
RECOVERED VIDEO
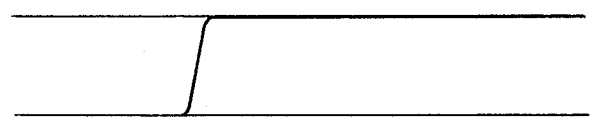
RESTRICTED BANDWIDTH
COMB RESPONSE
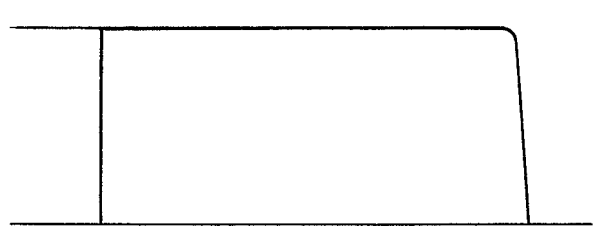
COMBED LUMINANCE

CIRCUIT FOR AND METHOD OF BROADBAND COMB FILTERING A COMPOSITE VIDEO SIGNAL WHICH HAS BEEN DOUBLE-SIDE BAND DETECTED

BACKGROUND OF THE INVENTION

1. Field of the Invention

This invention generally relates to a circuit for and method of processing periodic electrical signals and, more specifically, for an improved comb filtering technique for separating the luminance from the chrominance information contained in a color television composite video signal.

2. Description of the Prior Art

In color television systems, the intensity and color information which is produced by scanning a scene at a periodic horizontal scanning frequency, such as in the NTSC system developed in the United States, the monochrome intensity, or luminance, information and the color, or chrominance, information are interleaved in order to compress or minimize the total video bandwidth required to transmit both. With this arrangement, the luminance components, considered in the frequency domain, are clustered at integral multiples of the horizontal line scanning frequency (15,750 Hz) and the chrominance components are clustered at odd multiples of ½ the line scanning frequency. The major portion of the luminance energy is contained in low video frequencies contained in a bandwidth of approximately 2 MHz out of the total of the approximate 4.2 MHz bandwidth available to transmit picture information. While the major portion of the luminance energy is primarily contained within the lower frequencies of the available bandwidth, most of the color or chrominance information is contained within the upper 2 MHz of that video bandwidth. With older receivers, the luminance and chrominance signals were separated by simply using band pass filters to respectively transmit the desired and attenuate the undesired upper and lower frequency portions of the video spectrum, with the lower portion being directed to the luminance channel, and the upper portion being directed into the chrominance channel for further processing. A common approach is to limit the luminance (Y) frequencies to about 3.2 MHz. However, the high luminance frequencies enhance the horizontal (fine detail) resolution. Because the luminance components generally trail off in amplitude in the chrominance portion of the video spectrum, the luminance signals when processed in the chrominance channel do not unduly interfere with color processing although some interference could be detected. Likewise, the chrominance signals progressively decrease in amplitude in the lower luminance frequency portion of the video bandwidth but could produce some minor interference in the luminance channel. Such interference by each signal in the processing channel of the other signal is normally acceptable and such approach is widely used although the interference represents a deterioration of picture quality and the picture raster clarity or sharpness is less than optimum.

More recently, with the availability of low cost comb filters and delay lines, more and more receivers utilize comb filtering techniques for separating the luminance from the chrominance signals. Various comb filter arrangements for this purpose have been proposed. For example, such filtering techniques are described in U.S. Pat. Nos. 4,096,516 and 4,074,321. A problem that has been encountered, however, in the use of broadband combing techniques has been the loss of "vertical detail" in the picture. As is well known, extension of combing action into the low frequency luminance portion of the video bandwidth, which is not shared with the chrominance signal components, results in a drop off of the low frequency luminance frequency components. The luminance information has the same phase and is basically unchanged from scanning line to scanning line. The chrominance information, however, has its phase reversed from one scanning line to the next although the information content is otherwise the same. The comb filter will reject, for example, those frequencies (luminance) which have the same phase from line-to-line and pass with double amplitude those frequencies (chrominance) which have the opposite phases from line-to-line. The comb filter, can also be configurated to double the luminance frequencies while rejecting the chrominance frequencies. Since low frequency video signals represent the "vertical details," it is important to preserve the "flatness" of the low frequency video response in order to avoid loss of vertical resolution and, therefore, the integrity of all elements of the displayed image.

As a result of the loss of vertical detail information encountered with broad band combing, two approaches have been adopted. The first limits the combing action to the bandwidth of approximately 3–4 MHz in order to avoid combing of the low video frequencies with attendant distortion thereof. Another approach, when broad band combing has been performed, is to compensate for the loss of vertical details by using elaborate vertical detail enhancement circuitry, the purpose of which is to restore the lost low frequency video information. However, unless compensation is essentially in the correct amount, under compensation or over compensation may still result in a loss of vertical resolution and the extra cost of this circuitry does not always resolve the problem. Therefore, most comb filter structures result in a compromise between improved separation of the luminance and chrominance signals from each other and, consequently, "cleaner" signals in each of the luminance and chrominance channels and loss of vertical definition. The use of a comb filter provides approximately 25% increase in the horizontal (fine detail) resolution.

SUMMARY OF THE INVENTION

It is, accordingly, an object of the invention to efficiently separate the luminance and chrominance signals from a composite video signal.

It is another object of the invention to eliminate the requirement of a band pass filter to prevent improper amplitude response in the luminance channel when comb filtering is used.

It is still another object of the invention to provide a circuit for and method of broad band comb filtering a composite video signal which is both effective and economical to achieve.

It is a further object of the invention to provide a circuit for separating the luminance and chrominance signals from a composite video signal which improves the signal to noise performance with negligible loss of low frequency luminance frequencies and, therefore, "vertical detail" raster information.

It is still a further object of the invention to provide generally broad band combing of a composite video signal without the need for providing expensive and sometimes ineffective vertical detail enhancement circuits.

The aforementioned objects, as well as others which will become apparent hereafter, may be accomplished by the present invention, which is for a circuit for processing a vestigial side band composite video signal which includes frequency interleaved luminance and chrominance signals produced by scanning a scene at a horizontal scanning frequency. The circuit includes video detecting means for double side band detecting the composite video signal, including the vestigial frequencies which extend to a first predetermined frequency, to obtain a detected video composite signal. High pass filtering means is provided for filtering said detected video composite signal by attenuating the vestigial frequencies substantially up to said first preselected frequency and transmitting a first filtered video signal which comprises non-vestigial luminance signal frequencies extending from substantially said first preselected frequency to a second preselected frequency and chrominance signal frequencies extending from a third preselected frequency, intermediates said first and second preselected frequencies, and substantially said second preselected frequency. Comb filter means is provided for frequency combing said first filtered video signal at least between said first and second preselected frequencies to separate the interleaved luminance and chrominance signals between said first and second preselected frequencies and provide broad band luminance signals up to substantially said second preselected frequency and chrominance signals substantially between said second and third preselected frequencies.

The invention combines double side band detection with a wide band comb filter in such a manner that the advantages of both features are achieved without requiring complicated correction networks to obtain the desired resulting video response.

BRIEF DESCRIPTION OF THE DRAWINGS

These and other objects and features of the present invention may be understood with reference to the accompanying figures and the description of the preferred embodiment, wherein:

FIG. 2(a)-(f) illustrate the results of processing and band shaping in accordance with the present invention;

DESCRIPTION OF THE PREFERRED EMBODIMENTS

Figure 1:
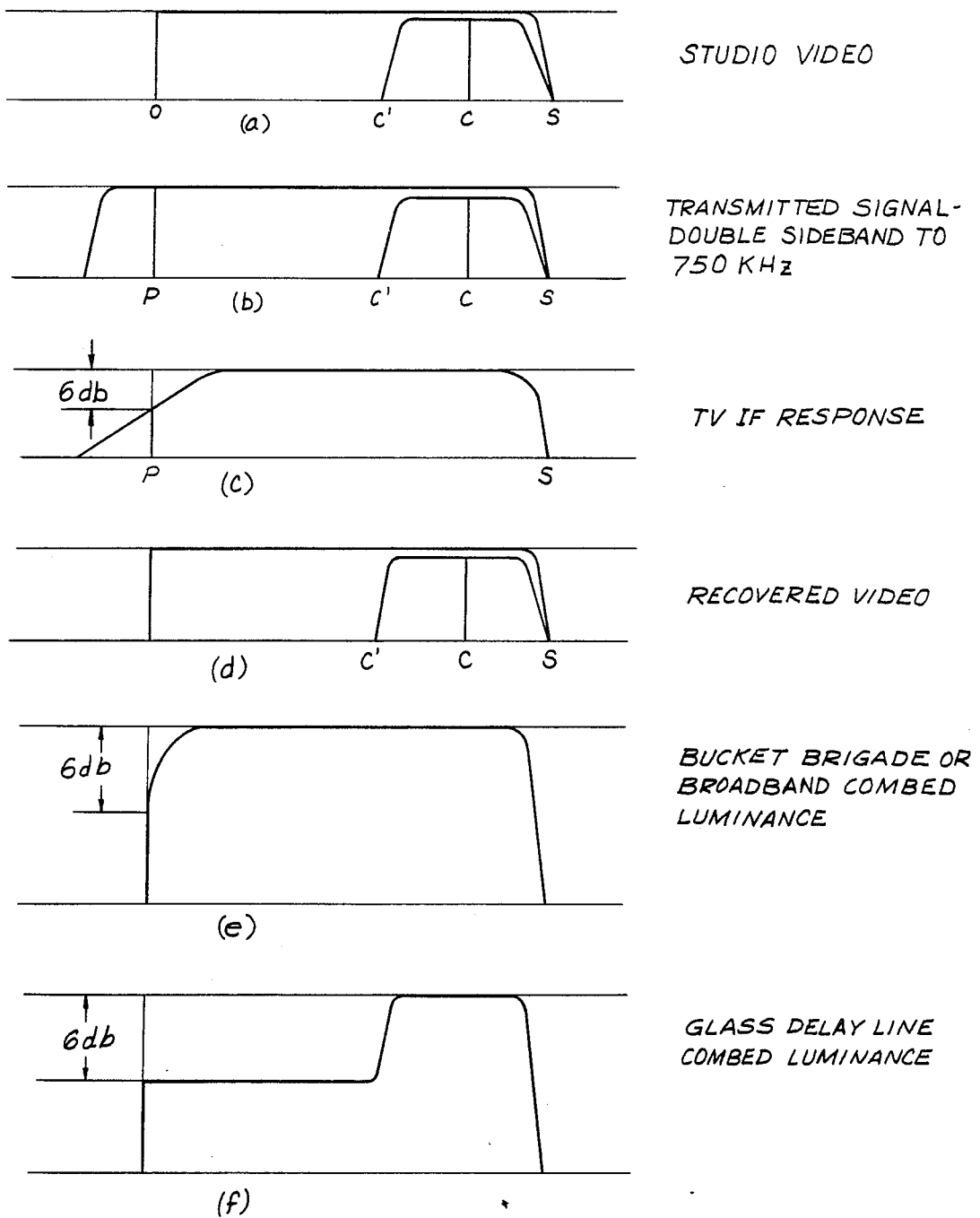
FIG. 1(a)-(f) illustrate results of processing video signals with exemplary prior art approaches.

In order to best understand the circuit and method of the present invention, reference is first made to FIG. 1(a)-(f) which illustrates prior art video signal processing and band shaping techniques. While it will become evident to those skilled in the art that the circuit and method of the present invention can be used for processing any vestigial side band composite video signal which includes frequency interleaved luminance and chrominance signals, the description that follows will make reference to the NTSC standards video signal adapted for television transmission in the United States. Although each channel width is 6 MHz, the bandwidth of the video signal, prior to transmission, is 4.5 MHz. The luminance or monochrome brightness information is substantially flat up to approximately 4.2 MHz and rolls off up to the 4.5 MHz sound carrier frequency "S". The color or chrominance information is centered around a chrominance sub-carrier frequency "C" located at approximately 3.58 MHz, with the chrominance information being interleaved between the luminance energy groups spanning a bandwidth as wide as from 2.08–4.08 MHz, approximately frequencies C' through S.

Just prior to transmission, the studio video signal is modulated and filtered to provide a vestigial lower side band having a bandwidth of approximately 750 KHz, so that the resulting transmitted composite video is double side band (DSB) for the first 750 KHz, and single side band (SSB) between approximately 750 KHz and 4.2 MHz.

Referring to FIGS. 1(c) and (d), in order to recover the original studio video from the transmitted vestigial side band signal of FIG. 1(b), conventional television receivers have utilized television IF amplifiers and detectors which exhibit a response of the type generally shown in FIG. 1(c), which essentially attenuates the picture carrier "P" approximately 6 db. In essence, the lower vestigial side band of the transmitted signal is attenuated and added to the upper portion of the double side band so that a substantially flat low frequency response is achieved without unduly complicated or expensive corrective circuits.

While the recovered video of FIG. 1(d) is essentially identical to the studio video shown in FIG. 1(a), the composite recovered video still contains the frequency interleaved luminance and chrominance signals and these must first be separated before they can each be further processed in their respective channels. However, when the video signal of FIG. 1(d) is combed employing a full bandwidth comb, the resultant luminance output will approximate the output as shown in FIG. 1(e). As will be noted, some luminance components below approximately 1 MHz will be deficient because the combed luminance signal is, by the nature of the combing process, the average of each two adjacent raster lines. Since a vertical transition from one raster line to the next consists of two adjacent lines which are of different amplitude, their average will produce a smearing effect at any vertical transition. To compensate for this loss of low frequency response, corrective measures have been taken, as suggested above.

As an alternate to the broad band comb of FIG. 1(e), a narrow band combing operation can be performed. This is generally achieved by placing a chroma band pass filter in front of the comb filter. Luminance components are combed from the chroma signal channel only between approximately 3 and 4.16 MHz. A band pass filter removes the luminance components below 3 MHz. Similarly, chroma components are combed in the luminance channel only between 3 and 4.16 MHz. This system proves adequate but not the ultimate since the NTSC signal does have chroma components below 3 MHz. A more serious deficiency of this arrangement is represented by FIG. 1(f). Here, the output luminance signal is shown after the combined effects of band passing and combing, the "luma" signal having double the output between 3 and 4.16 MHz. Such a response requires correction to provide optimum results.

The approach and method of the present invention will now generally be explained by reference to FIG. 2. The desired transmited video and transmitted signals of FIGS. 2(a) and (b) will be the same as previously shown and described in connection with FIG. 1. An important difference, however, is that the IF amplifier/detector system is designed, in accordance with the invention, not only to be flat to approximately 4.16 MHz at the high end, but also be flat in the double side band vestigial frequency region around the picture carrier P. The resulting recovered video response will be that of FIG. 2(d). The recovered video response, after double side band detection, is essentially double the response in the vestigial frequency region or band. While it will be apparent to those skilled in the art, the specific vestigial frequency is not critical but clearly corresponds to the frequency cut-off of the lower vestigial side band. When processing a NTSC composite video signal, the lower vestigial side band continues to approximately 750 kHz.

An important feature of the invention is that the resulting video response shows improved signal-to-noise performance because the generally high amplitude signals contained in the vestigial lower side band of the transmitted signal are no longer simply discarded or attenuated as has been previously done. Further, phase distortion is reduced.

Compensation of the amplitude response of FIG. 2(d) is both complicated and expensive. Rather than exercise this option, the present invention utilizes a modified broad band combing technique in such a manner as to compliment the discontinuity shown in FIG. 2(d) at a preselected frequency, 750 kHz in the specific example being described, where the recovered video signal is shifting from double to single side band. This may be achieved by high pass filtering the recovered video signal of FIG. 1(d) prior to the combing of that signal. The cut-off frequency of the high pass filter that can be used compliments the side band filter in the transmitter, and the filter response is shown in FIG. 2(e).

When the recovered video of FIG. 2(d) is fed through the filter response of FIG. 2(e) and combed in a broad band comb, the resulting combed luminance will have the response of FIG. 2(f). The combed chrominance response will be flat from approximately 1 MHz to 4.08 MHz and should be fed through a high pass or band pass filter to suppress undesired chrominance detector error products between approximately 1 and 2.08 MHz, which is the lower frequency C' of the lower I color sideband. Alternately, such filtering could be replaced by three low pass filters placed after the chroma detectors.

Figure 3:
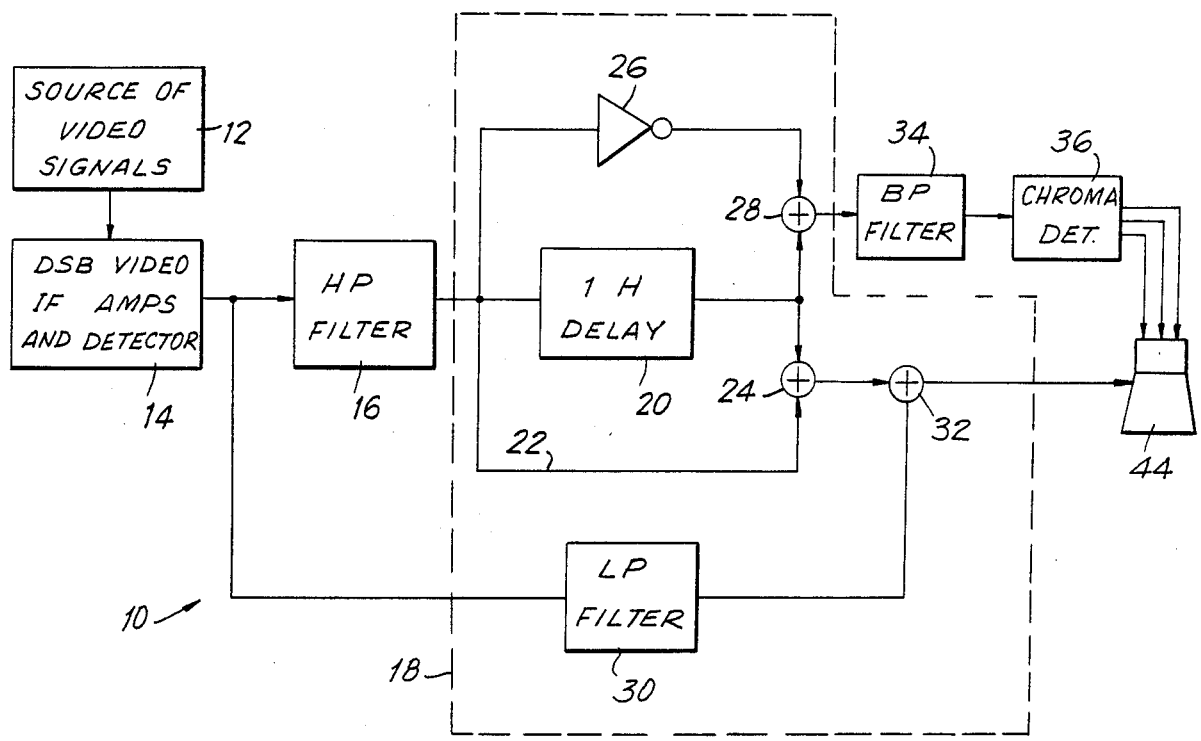
FIG. 3 is a block diagram of a circuit for broad band comb filtering a composite video signal in accordance with the invention.

Referring to FIG. 3, a specific embodiment is illustrated in block diagram form which can be used to accomplish the objects of the invention. The circuit of the invention is generally shown by the reference numeral 10 and includes a source 12 of NTSC video composite signals. The source 12 provides a transmitted signal of the type shown in FIG. 2(b) which includes double side band signals to approximately 750 kHz. The double side band video IF and detector stages 14 have the transfer function or characteristic shown in FIG. 2(c) which provides double side band detection in the vestigial regions, as aforementioned, resulting in a recovered video as shown in FIG. 2(d). While the specific frequencies are not critical, the frequencies which are to be discussed in connection with FIG. 3 are frequencies compatible with the NTSC standards for television transmission in the United States, since this will facilitate a description of the salient features of the invention. Thus, referring to FIG. 2(d), the recovered video is shown to have a substantially flat response, corresponding to the studio video of FIG. 1(a), with the exception for the lower vestigial side band frequencies which, after detection in the video detector 14, results in a doubling of the amplitude response for the vestigial frequencies up to approximately 750 kHz.

In accordance with an important feature of the invention, the recovered video of FIG. 1(d) is passed through a high pass filter 16 having its cut-off or break point frequency corresponding to the transition frequency between the double side band and single side band transmitted video frequencies. Therefore, the high pass filter 16 in the preferred embodiment has a cut-off or break point frequency at approximately 750 kHz, and has a transfer function which substantially corresponds to the response shown in FIG. 2(e). The output of the high pass filter 16 includes the single side band luminance frequencies and the chrominance frequencies up to 4.2 MHz, with all luminance frequencies below approximately 750 kHz having been suppressed or attenuated.

The non-vestigial or single side band luminance frequencies and the chrominance frequencies, all of which have an amplitude one-half of the detected vestigial side bands illustrated in FIG. 2(d), are passed through a comb filter generally designated by the reference numeral 18. As is well known to those skilled in the art, passing a composite luminance and chrominance signal through an appropriate comb filter separates the interleaved luminance and chrominance signals from each other while doubling their amplitude. The comb filter 18 used in FIG. 3 is a modified conventional comb filter which includes a delay element 20 which delays the incoming video signal by 63.5 microseconds which corresponds to the period of one complete raster horizontal scanning line. Conventional comb filters are known to those skilled in the art and described, for example, in the aforementioned U.S. patents. The comb filter 18 is shown in simplified block form and omits amplifying and attenuating elements normally included in such comb filters.

The output of the delay element 20, which may be in the nature of a delay line, is added to the composite video itself via a direct line 22, both the delayed and undelayed video signals being combined in an adder 24 the output of which contains only the luminance frequencies above approximately 750 kHz. All of the chrominance frequencies are substantially suppressed and do not appear at the output of the adder 24.

In order to comb or extract the chrominance signals or "energy bursts" from the interleaved frequency composite signal there is provided an inverter 26 which cooperates with the delay element 20. The output of the inverter 26 and the output of the delay element 20 are combined in the adder 28, the output of which contains only the chrominance frequencies.

Combing filters of the type under discussion have the property that the frequencies at the outputs of the adders are twice the input amplitudes of those same frequencies, so that the luminance signals at the output of the adder 24 are twice the amplitude of the incoming recovered video of FIG. 2(d). Similarly, the chrominance signals at the output of the adder 28 are twice their amplitude shown in the recovered video of FIG. 2(d). The comb filter 18, therefore, has the effect of equalizing the amplitudes of the filtered frequencies above 750 kHz, to levels which correspond to the double side-band detected vestigial frequencies below 750 kHz.

Since the vestigial frequencies below 750 kHz have been suppressed and, therefore, removed by the high pass filter 16, there is provided a low pass filter 30 which passes the double amplitude vestigial side band frequencies below 750 kHz in the recovered video signal of 2(d) to an adder 32 which recombines the luminance frequencies below 750 kHz and those between 750 kHz and 4.2 MHz to reconstruct the flat combed luminance response shown in FIG. 2(f). It will be noted that the combed luminance response of FIG. 2(f) achievable with the circuit 10 does not contain the low frequency drop-off resulting with conventional video processing circuits which utilized broad band comb filters without double sideband detection, as suggested in FIG. 1(e).

Because of the broadband nature of the filtering utilized in the circuit 10, the output of the adder 28 has an excessive chrominance bandwidth which may include non-chrominance, spurious interfering signals resulting from intermodulation or harmonic distortion as well as luminance components. Since these undesired signals may produce undesired frequencies in the chrominance processing channel, there is advantageously utilized a band pass filter 34 between the adder 28 and the chrominance detector or demodulator 36. The cut-off or break point frequency for the band pass filter 34 will be determined by the nature of the processing of the color side bands in the receiver. For most complete color reproduction, the chrominance channel processes the I and Q signals which represent the greatest bandwidth chrominance signals and, when processed in I,Q color demodulators, result in colors having the greatest fidelity to the original studio colors. Because the lower I chrominance bandwidth is approximately 1.5 MHz while the upper I,Q bandwidths are approximately 0.5 MHz, the band pass filter 34 is advantageously selected to have a lower cut-off frequency of approximately 2.08 MHz and an upper cut-off frequency of approximately 4.2 MHz. This bandwidth assures that all of the frequencies of both the I and Q chrominance signals are transmitted to the chrominance detector 36. While the I,Q system, when properly designed, provides excellent color reproduction, cost is an important aspect of receiver design. It has been found that it is possible to achieve acceptable results at lower cost, by limiting chrominance detector bandwidths. For example, 0.5 MHz for the lower chrominance bandwidth and 0.5 MHz for the upper chrominance bandwidth prove acceptable. In such narrower bandwidth system, only the larger objects are in color. Medium and small detail are rendered in black and white only. However, this loss of color detail is not generally observable by the average viewer. Thus, when color processing other than I,Q processing is used, the band pass filter 34 can be provided with a lower frequency cut-off of approximately 3.08 MHz and an upper cut-off frequency of approximately 4.2 MHz. The band pass filter 34 attenuates and effectively removes undesired spurious responses, as aforementioned, so that substantially pure chrominance frequencies are fed to the chrominance detector or demodulator stages 36.

Figure 4:
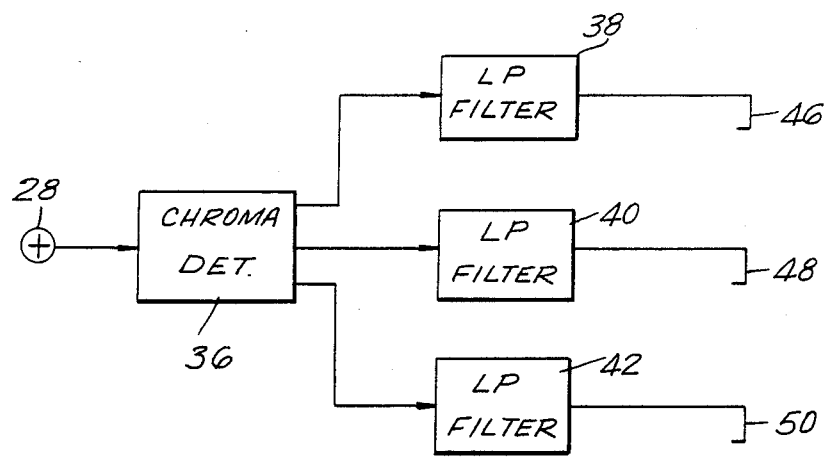
FIG. 4 is an alternate embodiment for filtering the chrominance signals following the combing filter in the circuit of FIG. 3.

Referring to FIG. 4, an alternate arrangement is shown which eliminates the band pass filter 34 of FIG. 3 and, instead, utilizes three low pass filters 38, 40 and 42. The output of the chrominance demodulators or detector 36, being the result of processing with possible spurious or undesired frequency components at the output of the adder 28, may contain resulting non-chrominance and, therefore, undesired signals having frequencies above 0.5 MHz. The non-chrominance signals are effectively eliminated by the low pass filters so that only the chrominance signals are fed to the CRT or picture tube 44 and, specifically, the red, green and blue grids 46, 48 and 50, thereof.

The descriptions herein have been of representative embodiments, and variations and modifications thereof may be possible without departing from the spirit of the invention.

What is claimed is:

1. Circuit for processing a vestigial sideband composite video signal which includes frequency interleaved luminance and chrominance signals produced by scanning a scene at a horizontal scanning frequency, comprising:
   (a) video detecting means for double side band detecting the composite video signal, including the vestigial frequencies which extend up to a first preselected frequency, to obtain a detected video composite signal;
   (b) high pass filtering means for filtering said detected video composite signal by attenuating the vestigial frequencies substantially up to said first preselected frequency and transmitting a first filtered video signal which comprises non-vestigial luminance signal frequencies extending from substantially said first preselected frequency to a second preselected frequency and chrominance signal frequencies extending from a third preselected frequency, intermediate said first and second preselected frequencies, and to substantially said second preselected frequency; and
   (c) comb filter means for frequency combing said first filtered video signal at least between said first and second preselected frequencies to separate the interleaved luminance and chrominance signals between said first and second preselected frequencies and providing broadband luminance signals up to substantially said second preselected frequency and chrominance signals substantially between said second and third preselected frequencies.

2. Circuit as defined in claim 1, wherein a NTSC composite video signal is to be processed, and wherein said first preselected frequency is approximately 750 kHz.

3. Circuit as defined in claim 2, wherein said high pass filtering means comprises a high pass filter having a cut-off frequency of approximately 750 kHz.

4. Circuit as defined in claim 1, wherein said comb filtering means includes low pass filtering means for filtering said detected video composite signal by attenuating the same between said first and second preselected frequencies and transmitting the vestigial frequencies substantially up to said first preselected frequency, forming a second filtered video signal; and adding means for adding the combed and separated luminance signals to said second filtered video signal to provide broadband luminance signals.

5. Circuit as defined in claim 1, further comprising band pass filter means for filtering the separated chrominance signals between said second and third preselected frequencies prior to color detection to filter out spurious, non-chroma signals within the chrominance frequency range extending between said second and third preselected frequencies.

6. Circuit as defined in claim 5, wherein a NTSC composite video signal is to be processed with I and Q color demodulators, and wherein said second preselected frequency is approximately 4.2 MHz and said third preselected frequency is approximately 2.08 MHz.

7. Circuit as defined in claim 5, wherein a NTSC composite video signal is to be processed, and wherein said second preselected frequency is approximately 4.2 MHz and said third preselected frequency is approximately 3.08 MHz.

8. Circuit as defined in claim 1, further comprising color demodulator means, having three outputs, for demodulating the separated chrominance signals from said comb filter means and generating driving signals at each of said outputs to be applied to the red, green and blue grids of a CRT or picture tube; and further comprising low pass filter means between each of said color demodulator means outputs and an associated grid, each low pass filter means having a chroma cut-off frequency selected to filter out spurious, non-chroma signals.

9. Circuit as defined in claim 8, wherein a NTSC composite video signal is to be processed, and wherein said chroma cut-off frequency is approximately 0.5 MHz.

10. Circuit as defined in claim 1, wherein said first, third and second preselected frequencies are approximately 1 MHz, 2.4 MHz and 4.16 MHz, respectively.

11. A method of processing a vestigial sideband composite video signal which includes frequency interleaved luminance and chrominance signals produced by scanning a scene at a horizontal scanning frequency, comprising the steps of:
  (a) double sideband detecting the composite video signal, including the vestigial frequencies which exend up to a first preselected frequency, to obtain a detected video composite signal;
  (b) filtering said detected video composite signal by attenuating the vestigial frequencies substantially up to said first preselected frequency and transmitting a first filtered video signal which comprises non-vestigial luminance signal frequencies extending from substantially said first preselected frequency to a second preselected frequency and chrominance signal frequencies extending from a third preselected frequency, intermediate said first and second preselected frequencies, and to substantially said second preselected frequency; and
  (c) frequency combing said first filtered video signal at least between said first and second preselected frequencies to separate the interleaved luminance and chrominance signals between said first and second preselected frequencies and providing broadband luminance signals up to substantially said second preselected frequency and chrominance signals substantially between said second and third preselected frequencies.

12. The method of claim 11, wherein a NTSC composite video signal is processed.

13. The method of claim 11, further comprising the steps of filtering said detected video composite signal by attenuating the same between said first and second preselected frequencies and transmitting the vestigial frequencies substantially up to said first preselected frequency, forming a second filtered video signal; and adding the combed and separated luminance signals to said second filtered video signal to provide broadband luminance signals.

14. The method of claim 11, further comprising the steps of filtering the separated chrominance signals between said second and third preselected frequencies prior to color detection to filter out spurious, non-chroma signals within the chrominance frequency range extending between said second and third preselected frequencies.

15. The method of claim 11, further comprising the steps of demodulating the separated chrominance signals to provide three driving color signals to be applied to the red, green and blue grids of a CRT or picture tube; and low pass filtering the three driving color signals to filter out spurious; non-chroma signals.

* * * * *